United States Patent
Ruth (10) Patent No.: US 10,605,209 B2
(45) Date of Patent: Mar. 31, 2020

(54) THERMAL MANAGEMENT VIA EXHAUST GAS RECIRCULATION (71) Applicant: Cummins Inc., Columbus, IN (US)

(72) Inventor: Michael J. Ruth, Franklin, IN (US)

(73) Assignee: Cummins Inc., Columbus, IN (US)

( * ) Notice: Subject to any disclaimer, the term of this patent is extended or adjusted under 35 U.S.C. 154(b) by 395 days.

(21) Appl. No.: 14/925,382

(22) Filed: Oct. 28, 2015

(65) Prior Publication Data

US 2017/0122232 A1 May 4, 2017

(51) Int. Cl.
*F02M 26/52* (2016.01)
*F02D 41/00* (2006.01)
*F02M 26/51* (2016.01)
*F02D 13/02* (2006.01)
*F02D 21/08* (2006.01)
*F02D 13/04* (2006.01)
*F02M 26/42* (2016.01)
*F02D 13/06* (2006.01)

(52) U.S. Cl.
CPC ......... *F02M 26/52* (2016.02); *F02D 13/0207* (2013.01); *F02D 13/04* (2013.01); *F02D 21/08* (2013.01); *F02D 41/005* (2013.01); *F02D 41/006* (2013.01); *F02D 41/008* (2013.01); *F02D 41/0065* (2013.01); *F02M 26/42* (2016.02); *F02M 26/51* (2016.02); *F02D 13/0257* (2013.01); *F02D 13/06* (2013.01); *F02D 2041/001* (2013.01); *Y02T 10/16* (2013.01)

(58) Field of Classification Search
CPC ........ F02M 26/52; F02M 26/42; F02M 26/51; F02D 21/08; F02D 41/006; F02D 41/005; F02D 13/0207; F02D 13/04; F02D 41/008; F02D 41/0065; F02D 13/06; F02D 13/0257; F02D 2041/001; Y02T 10/16
See application file for complete search history.

(56) References Cited

U.S. PATENT DOCUMENTS 3,779,218 A * 12/1973 Nambu ................. F02P 5/1558
123/406.67
4,009,695 A * 3/1977 Ule ......................... F01L 9/02
123/90.13
4,114,374 A * 9/1978 Tanahashi ............... F02B 1/06
123/198 F (Continued)

FOREIGN PATENT DOCUMENTS

DE 102013212169 A1 * 5/2014 ............ F02D 13/06
JP 02091449 A * 3/1990

*Primary Examiner* — Sizo B Vilakazi
*Assistant Examiner* — Brian R Kirby
(74) *Attorney, Agent, or Firm* — Foley & Lardner LLP (57) ABSTRACT Methods and systems of recirculating exhaust gas in internal combustion engines are disclosed. An internal combustion engine includes a set of cylinders, an intake system disposed in fluid providing communication with the set of cylinders, an exhaust system disposed in fluid exchanging communication with the set of cylinders, and a controller. In response to a detected recirculation condition, the controller prevents fluid communication between the intake system and a subset of the set of cylinders and recirculates exhaust gas between the subset of the set of cylinders and the exhaust system.

21 Claims, 3 Drawing Sheets

(56) References Cited

U.S. PATENT DOCUMENTS

| | | | | |
|---|---|---|---|---|
| 4,137,965 A * | 2/1979 | Fallon, Jr. | F23L 15/045 | 122/504.2 |
| 4,227,505 A * | 10/1980 | Larson | F02D 17/02 | 123/198 F |
| 4,474,008 A * | 10/1984 | Sakurai | F02B 37/12 | 123/568.27 |
| 4,598,684 A * | 7/1986 | Kato | F02D 41/0065 | 123/478 |
| 4,787,343 A * | 11/1988 | Tuckey | F02B 13/10 | 123/533 |
| 5,115,790 A * | 5/1992 | Kawamura | F02B 1/02 | 123/568.2 |
| 5,184,580 A * | 2/1993 | Ascari | F01L 1/265 | 123/308 |
| 5,921,216 A * | 7/1999 | Ballman | F02D 13/04 | 123/321 |
| 5,930,992 A * | 8/1999 | Esch | F01N 3/2006 | 123/198 F |
| 5,934,263 A * | 8/1999 | Russ | F01L 1/34 | 123/568.14 |
| 5,967,113 A * | 10/1999 | Kaneko | F02B 17/005 | 123/295 |
| 6,161,521 A * | 12/2000 | Russ | F01L 1/34 | 123/324 |
| 6,386,154 B1 * | 5/2002 | Hellman | F02D 13/0276 | 123/568.12 |
| 6,393,841 B1 * | 5/2002 | Van Husen | F02B 41/06 | 123/51 R |
| 6,431,154 B1 * | 8/2002 | Inoue | F01L 9/04 | 123/198 DB |
| 6,543,398 B1 * | 4/2003 | Roberts, Jr. | F02B 33/22 | 123/197.1 |
| 6,553,959 B2 * | 4/2003 | Xu | F02B 17/005 | 123/295 |
| 6,668,546 B2 * | 12/2003 | Hayman | F01L 1/02 | 60/284 |
| 6,931,839 B2 * | 8/2005 | Foster | F01N 3/023 | 123/481 |
| 6,966,309 B1 * | 11/2005 | Roberts, Jr. | F02D 13/0215 | 123/21 |
| 7,096,833 B2 * | 8/2006 | Hitomi | F02B 75/20 | 123/305 |
| 7,159,581 B2 * | 1/2007 | Pagot | F01L 9/00 | 123/568.13 |
| 7,306,202 B2 * | 12/2007 | Udd | F01L 1/267 | 123/90.16 |
| 7,334,549 B2 | 2/2008 | Lewis et al. | | |
| 7,461,504 B2 * | 12/2008 | Warner | F01N 3/023 | 123/90.15 |
| 7,607,503 B1 * | 10/2009 | Schechter | B60K 6/12 | 180/165 |
| 7,805,927 B2 * | 10/2010 | Brown | F02D 17/02 | 123/198 F |
| 8,100,116 B2 | 1/2012 | He et al. | | |
| 8,100,117 B2 | 1/2012 | Riegger et al. | | |
| 8,360,036 B2 | 1/2013 | Riegger et al. | | |
| 8,646,421 B2 | 2/2014 | Durrett et al. | | |
| 8,781,713 B2 * | 7/2014 | Brennan | F02D 13/06 | 123/198 F |
| 2002/0062799 A1 * | 5/2002 | Murata | F01L 1/34 | 123/90.15 |
| 2003/0101961 A1 * | 6/2003 | Foster | B60H 1/00314 | 123/198 F |
| 2003/0222611 A1 * | 12/2003 | Kumar | H02P 3/14 | 318/375 |
| 2004/0139733 A1 * | 7/2004 | Koga | F01N 9/002 | 60/280 |
| 2004/0168655 A1 * | 9/2004 | Hitomi | F01L 1/185 | 123/58.8 |
| 2004/0216449 A1 * | 11/2004 | Szymkowicz | F01N 3/2006 | 60/284 |
| 2004/0255576 A1 * | 12/2004 | Brown | F02D 17/02 | 60/285 |
| 2006/0037578 A1 * | 2/2006 | Nakamura | F01L 1/185 | 123/198 F |
| 2006/0130459 A1 * | 6/2006 | Warner | F01N 3/023 | 60/286 |
| 2007/0215119 A1 * | 9/2007 | Pagot | F02D 13/0215 | 123/481 |
| 2008/0041336 A1 * | 2/2008 | Gibson | F02D 13/04 | 123/322 |
| 2008/0210197 A1 * | 9/2008 | Smith | F02D 9/06 | 123/321 |
| 2008/0230021 A1 * | 9/2008 | Persson | F02D 17/02 | 123/90.15 |
| 2009/0042463 A1 * | 2/2009 | Kinoshita | B63B 35/731 | 440/38 |
| 2010/0071656 A1 * | 3/2010 | Freese, V | F01L 13/0005 | 123/198 F |
| 2010/0257858 A1 * | 10/2010 | Yaguchi | F02G 1/053 | 60/525 |
| 2010/0288229 A1 * | 11/2010 | Lancefield | F01L 1/047 | 123/321 |
| 2011/0313643 A1 * | 12/2011 | Lucatello | F02D 13/0261 | 701/112 |
| 2012/0036848 A1 * | 2/2012 | Quix | F02B 37/18 | 60/605.2 |
| 2012/0042649 A1 * | 2/2012 | Kaneko | F01L 1/08 | 60/614 |
| 2012/0059572 A1 * | 3/2012 | Larsson | F02D 41/0055 | 701/112 |
| 2013/0019828 A1 * | 1/2013 | Nagatsu | F02D 41/0002 | 123/90.15 |
| 2013/0086893 A1 * | 4/2013 | Shinoda | F02D 41/0055 | 60/278 |
| 2013/0213349 A1 * | 8/2013 | Sellnau | F02B 23/101 | 123/295 |
| 2014/0007851 A1 * | 1/2014 | Vassallo | F02D 41/0055 | 123/568.11 |
| 2014/0013743 A1 * | 1/2014 | Dane | F01K 23/065 | 60/615 |
| 2014/0026574 A1 * | 1/2014 | Leibowitz | F01K 25/08 | 60/651 |
| 2014/0142833 A1 * | 5/2014 | Gingrich | F02D 41/0255 | 701/103 |
| 2014/0144414 A1 * | 5/2014 | Dean | F02D 41/006 | 123/568.14 |
| 2014/0245993 A1 * | 9/2014 | Weber | F02D 13/06 | 123/349 |
| 2015/0040560 A1 * | 2/2015 | Jozsa | F02D 41/0065 | 60/602 |
| 2015/0275779 A1 * | 10/2015 | Froehlich | F01L 13/0005 | 701/102 |

* cited by examiner

THERMAL MANAGEMENT VIA EXHAUST GAS RECIRCULATION

TECHNICAL FIELD

The present disclosure relates to internal combustion engines.

BACKGROUND

During operation of an internal combustion engine, excess fuel may be unnecessarily consumed when the internal combustion engine is not operating under a heavy load. In such arrangements, air and fuel may continue to be delivered to and ignited within each cylinder in the internal combustion engine, even if current load demands are less than the current output of the engine. In addition, various systems associated with an exhaust system of the internal combustion engine may not operate properly, or may operate inefficiently, unless exhaust gas temperatures are produced at some minimum threshold level.

SUMMARY

One embodiment relates to an internal combustion engine. The internal combustion engine includes a set of cylinders, an intake system, an exhaust system, and a controller. The intake system is disposed in fluid providing communication with the set of cylinders, and the exhaust system is disposed in fluid exchanging communication with the set of cylinders. The controller is configured to, in response to a detected recirculation condition, prevent fluid communication between the intake system and a subset of the set of cylinders and recirculate exhaust gas between the subset of the set of cylinders and the exhaust system.

Another embodiment relates to a method of operating an internal combustion engine. The method includes detecting, by a controller, a recirculation condition associated with the internal combustion engine. The method includes detecting, by a controller, a recirculation condition. The method further includes executing, by the controller and in response to the recirculation condition, a recirculation operation to be performed on a subset of a set of cylinders by preventing fluid communication between the subset of the set of cylinders and an intake system and recirculating exhaust gas between the subset of the set of cylinders and an exhaust system.

Yet another embodiment relates to an exhaust recirculation controller selectively executing recirculating operations on a subset of a set of cylinders of an internal combustion engine, the subset of the set of cylinders in fluid receiving communication with an intake system and in fluid exchanging communication with an exhaust system. The exhaust recirculation controller includes at least one sensor module configured to collect data relating to recirculation conditions and increased load conditions. The exhaust recirculation controller further includes a recirculation condition detection module configured to detect a recirculation condition based on data received from the at least one sensor module. The exhaust recirculation controller includes a recirculation operation execution module configured to execute, in response to the recirculation condition, a recirculation operation on the subset of the set of cylinders by preventing fluid communication between the intake system and the subset of the set of cylinders and recirculating exhaust gas between the exhaust system and the subset of the set of cylinders.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive internal combustion engines and methods of operating internal combustion engines. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

The present disclosure relates to internal combustion engines, which may be incorporated into any of a variety of vehicles (e.g., passenger and/or cargo transporting vehicles, utility vehicles, and so on). Engines are a source of mechanical force, which may be used to drive operations performed by associated vehicles (e.g., to rotate one or more wheels for movement, to actuate one or more hydraulic systems, etc.). Common engine arrangements consume diesel or unleaded fuel to generate mechanical force while producing heat and an exhaust gas (e.g., including regulated emissions) as a waste product.

Figure 1:
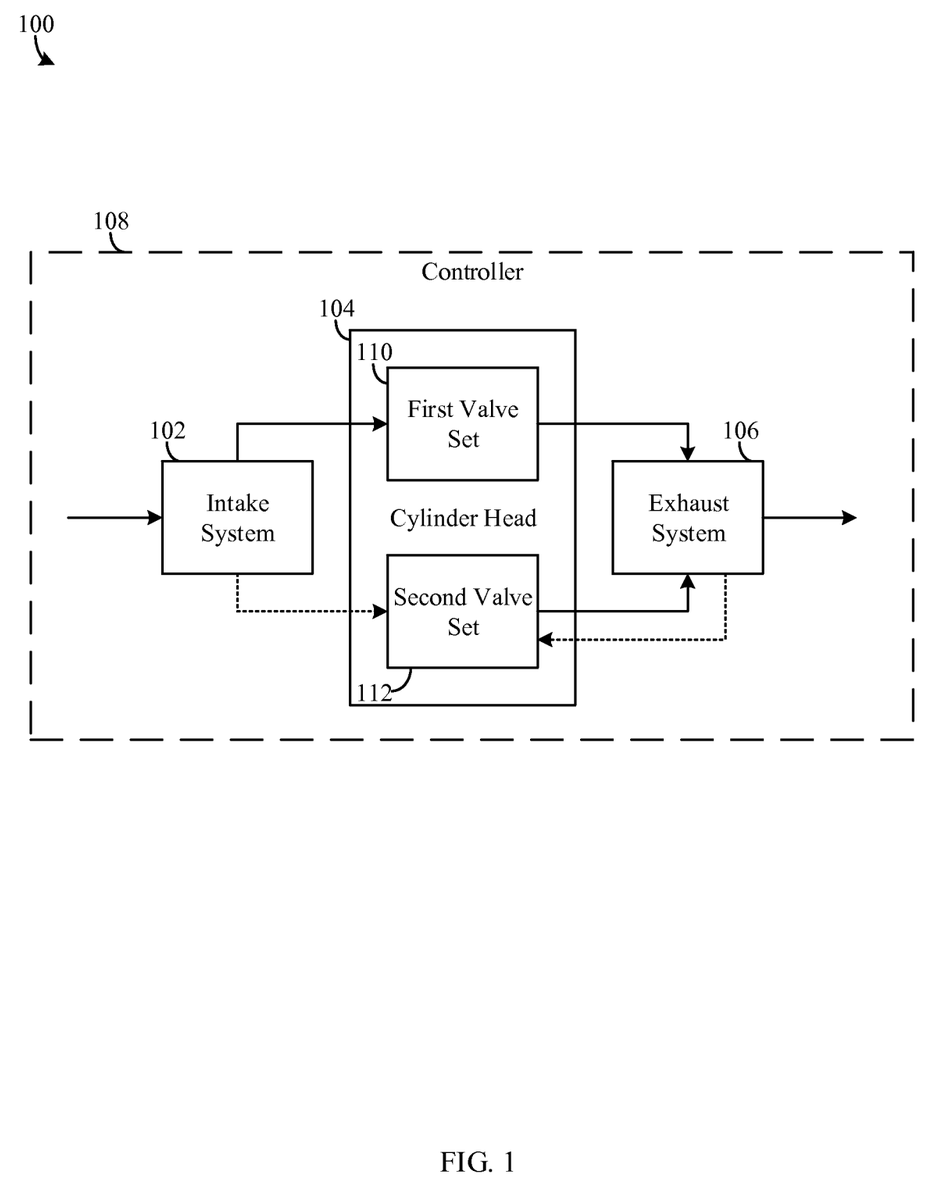
FIG. 1 shows a schematic block diagram of an engine with a set of cylinders, a subset of which are exhaust recirculating cylinders, according to an example embodiment.

Referring to FIG. 1, an internal combustion engine 100 includes a cylinder head 104 communicatively coupled to an intake system 102 and an exhaust system 106. The intake system 102 is configured to route air from the atmosphere to the cylinder head 104 for combustion, and may include a plurality of interconnected conduits, chambers, filters, etc. In some arrangements, the intake system 102 includes an intake manifold in airflow providing communication with a plurality of intake ports disposed at the cylinder head 104.

In turn, the exhaust system 106 is configured to route exhaust gas from the cylinder head 104 out to the atmosphere, and may also include a plurality of interconnected conduits, chambers, and so on. In some arrangements, the exhaust system 106 includes an exhaust manifold in exhaust gas receiving communication with a plurality of exhaust ports at the cylinder head 104.

In particular embodiments, the exhaust system 106 includes an aftertreatment system, which may include any of several different components to reduce the levels of regulated pollutants present in exhaust gas produced by the engine 100. For example, the exhaust aftertreatment system may include various components, such as a diesel oxidation catalyst, a selective catalytic reduction (SCR) catalyst, a diesel particulate filter, an SCR on filter and/or an ammonia slip catalyst (ASC) (also referred to as an ammonia oxidation catalyst (AMOX)). Each of the oxidation catalyst, the SCR catalyst, the particulate filter, the SCR on filter and the ASC components are configured to perform a particular exhaust emissions treatment operation on the exhaust gas passing through or over the respective components.

Generally, oxidation catalysts reduce the amount of carbon monoxide (CO) and hydrocarbons (HC) present in the exhaust gas via oxidation techniques, as well as convert nitric oxide (NO) to nitrogen dioxide ($NO_2$) for passive regeneration of soot on a particulate filter and to facilitate fast SCR reactions. Particulate filters filter particulate matter, including soot, present in the exhaust gas. SCR catalysts and SCR on filter systems have been developed to remove $NO_x$ from the exhaust gas, which is relatively more difficult to remove than CO, HC and particulate matter.

SCR catalysts are configured to convert $NO_x$ (i.e., nitrogen oxides, such as NO and NO2 in some fraction) into nitrogen gas (i.e., $N_2$) and water vapor (i.e., $H_2O$). A reductant (e.g., typically ammonia ($NH_3$) in some form) is added to the exhaust gas upstream of the catalyst. The $NO_x$ and $NH_3$ pass over the catalyst and a catalytic reaction takes place in which NOx and $NH_3$ are converted into $N_2$ and $H_2O$. An SCR on filter is an assembly that performs the combined functions of an SCR and a particulate filter.

Sufficient application of heat to the aftertreatment system is an important aspect of managing regulated emissions in exhaust gas. In many conventional SCR and SCR on filter systems, $NH_3$ is used as a reductant. Typically, pure $NH_3$ is not directly used due to safety concerns, expense, weight, lack of infrastructure, and other factors. Instead, many conventional systems utilize diesel exhaust fluid (DEF), which typically is a urea-water solution. To convert the DEF into $NH_3$, the DEF is injected into a decomposition tube through which an exhaust stream flows. The injected DEF spray is heated by the exhaust gas stream to vaporize the urea-water solution and trigger the decomposition of urea into $NH_3$. The exhaust gas mixture, including the $NH_3$ decomposed from the urea, further mixes while flowing through the decomposition tube and passes over the SCR catalyst, where the $NO_x$ and $NH_3$ are converted primarily to $N_2$ and $H_2O$.

In addition, exhaust gas heat may be used to maintain various aspects of the aftertreatment system. For example, over the course of operation, diesel particulate filters may become clogged after a period of time. Under such conditions, exhaust gas at some minimum temperature may be used to burn off accumulated particulate matter to clear up a clogged filter. In some arrangements, one or more aspects of the engine 100 may be adjusted to increase the exhaust gas temperature to at least a target temperature sufficient to conduct a regeneration of portions of the aftertreatment system.

In various arrangements, the cylinder head 104 regulates airflows to and from an associated engine block (not shown). The engine block includes a set of cylinders housing a corresponding set of reciprocating pistons. Portions of air and fuel are cyclically collected from the intake system 102 and ignited in each of the set of cylinders to drive the movement of the corresponding set of pistons. As a result of each ignition cycle, exhaust gas and heat are produced in each cylinder in the set of cylinders and expelled through the exhaust system 106.

The cylinder head 104 includes a first cylinder valve subset 110 in fluid communication with a first subset of cylinders and a second cylinder valve subset 112 in fluid communication with a second subset of cylinders. For example, in engines having a six cylinder configuration (with a set of six cylinders), three or four cylinders may be included in the first subset of cylinders, and three or two cylinders may be included in the second subset of cylinders, respectively. As another example, in engines with a twelve cylinder configuration, the first subset of cylinders may include nine, six, or three cylinders, and the second subset of cylinders may include three, six, or nine cylinders respectively. Consistent across these and other example arrangements, each of the first subset of cylinders and the second subset of cylinders includes some but not all of the set of cylinders in a given engine.

Each of the first cylinder valve subset 110 and the second cylinder valve subset 112 includes a plurality of cylinder valves disposed in a respective plurality of ports. For example, the first cylinder valve subset 110 and the second cylinder valve subset 112 includes a plurality of cylinder intake valves, each cylinder intake valve regulating airflow from the intake system 102 into a cylinder of the set of cylinders via a corresponding intake port. The first cylinder valve subset 110 and the second cylinder valve subset 112 further includes a plurality of cylinder exhaust valves, each cylinder exhaust valve regulating exhaust gas flow between a cylinder of the set of cylinders and the exhaust system 106 via a corresponding exhaust port.

In some arrangements, the cylinder head 104 includes a variable valve actuation assembly allowing at least the second cylinder valve subset 112 to follow various cylinder valve actuation patterns. The variable valve actuation assembly can, for example, keep certain cylinder intake valves closed, increase the frequency of cylinder exhaust valve actuation cycles, enable early and/or late cylinder intake valve closing, early and/or late cylinder exhaust valve closing, and variable lift or duration secondary valve events for internal exhaust gas recirculation and compression braking. The system could also be configured to enable variable valve timing, variable valve lift, and variable swirl through independent variable lift of the cylinder intake valves. An example of such a variable valve actuation assembly is provided in Variable Valve Actuation System and Method Using Variable Oscillating Cam, U.S. Pat. No. 8,789,502 issued to David M. Barnes and assigned to Cummins Intellectual Property, Inc., hereby incorporated by reference in full.

The controller 108 includes a processor and non-transient computer-readable media that together provide a circuit configured to perform operations that include sending and receiving signals throughout the engine 100. In some arrangements, the controller 108 is communicatively coupled to a plurality of sensors disposed throughout a vehicle (e.g., sensors disposed at the intake system 102, the cylinder head 104, the exhaust system 106, and so on). Further, the controller 108 can be communicatively coupled to a plurality of mechanical devices that can be electrically actuated (e.g., variable valve actuation assemblies at the cylinder head 104).

In certain implementations, the controller 108 includes one or more modules structured to functionally execute the operations of the controller 108. In certain implementations, the controller 108 may include a control module for performing the operations described in reference to FIG. 3. The description herein including modules emphasizes the structural independence of the aspects of the controller 108 and illustrates one grouping of operations and responsibilities of the controller 108. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIGS. 1-3.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

In operation, the controller 108 may adjust the operation of the second cylinder valve subset 112 in response to various conditions. For example, under conditions where the engine 100 is at full or near full load (e.g., at open or near open throttle), the controller 108 may cause each of the first cylinder valve subset 110 and the second cylinder valve subset 112 to deliver air from the intake system 102 to each corresponding subset of cylinders, and allow exhaust gas to flow from each corresponding subset of cylinders to the exhaust system 106.

The controller 108 may also perform operations sufficient to decrease fuel consumption and/or increase exhaust temperatures with little or no pumping loss in the engine 100. In one arrangement, the controller 108 maintains each cylinder intake valve in the second cylinder valve subset 112 in a closed position (e.g., via a variable valve actuation assembly), thereby preventing airflow from the intake system 102 from reaching the second subset of cylinders. Further, the controller 108 causes each cylinder exhaust valve in the second cylinder valve subset 112 to allow exhaust gas to flow from the exhaust system 106 into the second subset of cylinders (i.e., in lieu of airflow from the intake system 102). In addition, the second cylinder valve subset 112 continues to allow exhaust gas to flow from the second subset of cylinders to the exhaust system 106. As a result, exhaust gas is recirculated between the exhaust system 106 and the second subset of cylinders. In such arrangements, exhaust gas recirculation may be performed in the absence of conventional recirculation systems, which typically include large or otherwise burdensome additions to the engine (e.g., additional conduits, valves, actuators, etc., configured to couple exhaust systems to intake systems).

As one of skill in the art would recognize, reduced amounts of fuel may be delivered to the second subset of cylinders to maintain target air/fuel ratios while recirculating exhaust gas, thereby reducing fuel consumption while the engine 100 is operating under partial load. While recirculating exhaust gas, the controller 108 may provide the same amount of fuel to the second subset of cylinders as the first subset of cylinders, provide a reduced amount of fuel to the second subset of cylinders, or provide no fuel to the second subset of cylinders. In addition, the first subset of cylinders and the first cylinder valve subset 110 continue to operate in a conventional manner (i.e., not recirculating exhaust gas), delivering fresh exhaust gas to the exhaust system 106, which may be shared with the second subset of cylinders. As such, little to no pumping losses results from the recirculation of exhaust gas in the second subset of cylinders.

The recirculation operation described above may also be performed independent of or in conjunction with detected partial load conditions. For example, the controller 108 may determine that exhaust gas temperatures in the exhaust system 106 are too low (e.g., where the engine 100 has just started, where the engine 100 is operating in cold conditions, etc.) for the aftertreatment system to operate properly (e.g., poor NOx control, poor catalyst oxidation, etc.). In response to low exhaust gas temperatures, the controller 108 may perform the recirculation operation to decrease the amount of cold airflow from the intake system 102 reaching the set of cylinders, and increase the temperature of the exhaust gas (e.g., by recirculating and igniting exhaust gas). In some arrangements, the controller 108 may be configured to recirculate exhaust gas even when the engine 100 is being operated under heavy loads if one or more recirculation conditions are present. Alternatively, the controller 108 may be configured to prevent exhaust gas recirculation regardless of any recirculation conditions when the engine 100 is being operated under heavy load.

Figure 2:
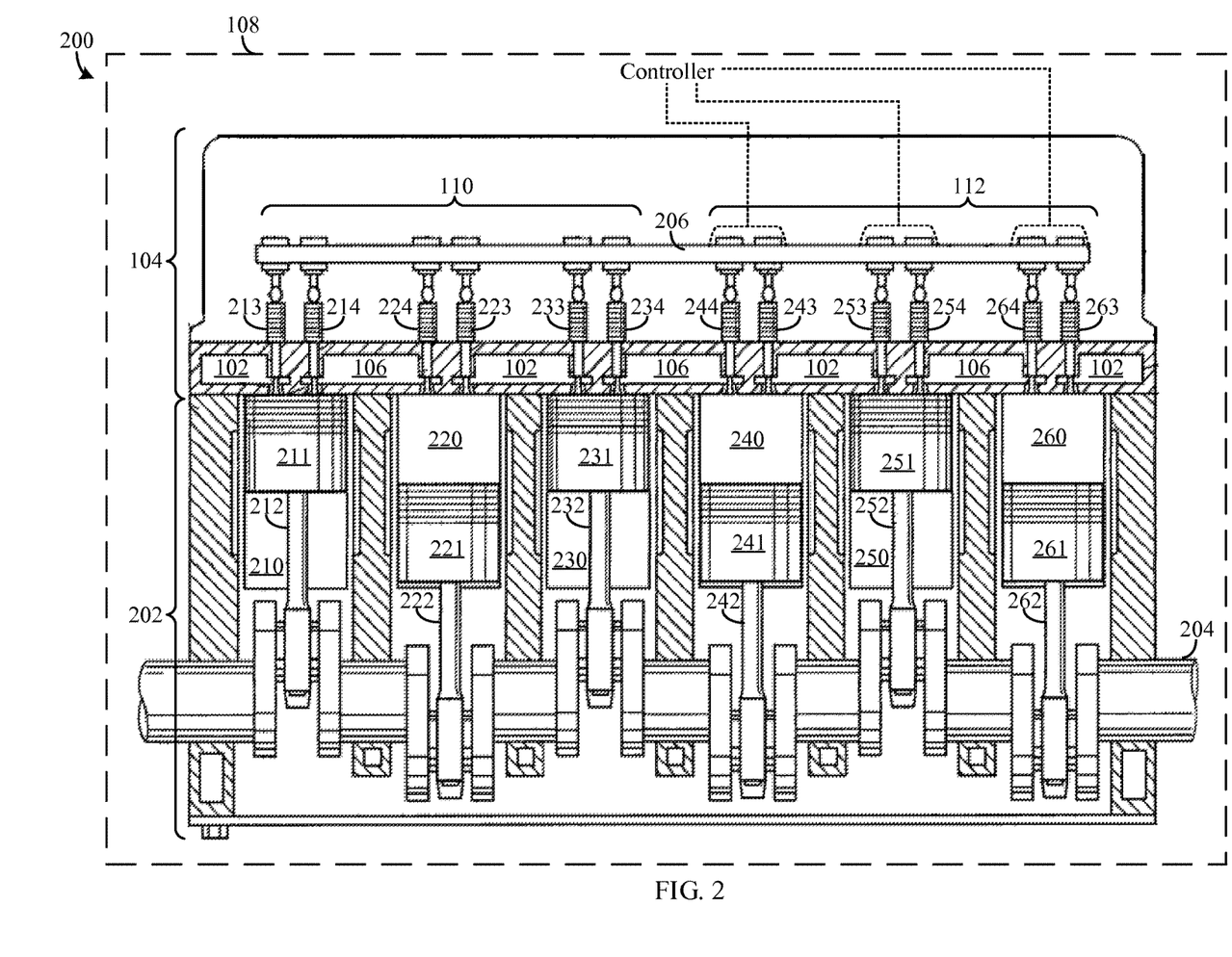
FIG. 2 is a schematic view illustrating additional features of the engine shown in FIG. 1.

Referring to FIG. 2, an engine 200 is shown in a schematic format. The engine 200 as shown includes a plurality of cylinders in a straight configuration (e.g., as opposed to a "V" configuration) for demonstrative purposes, and may be relevant to internal combustion engines of various sizes and configurations (e.g., engines with four, six, eight, twelve, etc. cylinders, "V" configuration engines, flat configuration engines, straight configuration engines, etc.).

The engine 200 includes the cylinder head 104 and a block 202. The block 202 includes a set of cylinders having a first cylinder 210 housing a first piston 211, a second cylinder 220 housing a second piston 221, a third cylinder 230 housing a third piston 231, a fourth cylinder 240 housing a fourth piston 241, a fifth cylinder 250 housing a fifth piston 251, and a sixth cylinder 260 housing a sixth piston 261. Each of the cylinders are hollow combustion chambers providing a range of movement for a respective piston disposed within. Each of the pistons are operatively coupled to a crankshaft 204 via a corresponding rod (212, 222, 232, 242, 252, and 262, respectively). The crankshaft 204 translates a linear force provided by a piston (e.g., piston 211) and communicated via a respective rod (e.g., rod 212) into a rotational force (e.g., to drive a flywheel).

The cylinder head 104 has a cylinder valve set including the first cylinder valve subset 110, the second cylinder valve subset 112, and portions of the intake system 102 (e.g., intake manifold ports) and the exhaust system 106 (e.g., exhaust manifold ports). The first cylinder valve subset 110 includes cylinder intake valves and cylinder exhaust valves in fluid communication with a first subset of cylinders, including the first cylinder 210 (i.e., 213 and 214, respectively), the second cylinder 220 (i.e., 223 and 224, respectively), and the third cylinder 230 (i.e., 233 and 234, respectively). In turn, the second cylinder valve subset 112 includes cylinder intake valves and cylinder exhaust valves in fluid communication with a second subset of cylinders, including the fourth cylinder 240 (i.e., 243 and 244, respectively), the fifth cylinder 250 (i.e., 253 and 254, respectively), and the sixth cylinder 260 (i.e., 263 and 264, respectively).

Each of the cylinder valves may be operatively coupled to a camshaft assembly 206, which may include one or more camshafts and variable valve actuation assemblies. For example, although FIG. 2 shows a straight cylinder configuration with a single camshaft assembly 206 across all cylinder valves, the present disclosure also contemplates alternative configurations (e.g., "V", flat, "L", etc. configurations), each of which may include more than one cylinder head (e.g., one cylinder head per cylinder bank) and more than one camshaft assembly (e.g., one or more per cylinder head). The camshaft assembly 206 is configured to dictate the actuation of each of the cylinder valves in the cylinder head 104. For example, the camshaft assembly 206 may be configured to actuate a cylinder intake valve (e.g., 213) to allow airflow from the intake system 102 to accumulate flow into a cylinder (e.g., 210) prior to ignition, and to close the cylinder intake valve and open a corresponding cylinder exhaust valve (e.g., 214) after ignition.

The camshaft assembly 206 may also be configured to selectively perform a recirculation operation. For example, the camshaft assembly 206 may maintain each of the cylinder intake valves in the second cylinder valve subset 112 (e.g., 243, 253, 263) in a closed position during an intake stroke. In addition, the camshaft assembly 206 may open each of the cylinder exhaust valves in the second cylinder valve subset 112 (e.g., 244, 254, 264) prior to ignition in each respective cylinder (e.g., 240, 250, 260) and after ignition in each respective cylinder. At the same time, the camshaft assembly 206 may continue to operate the cylinder valves in the first cylinder valve subset 110 in a conventional manner (i.e., cyclically opening and closing both the cylinder intake valves and the cylinder exhaust valves). As a result, while airflow from the intake system 102 is collected, ignited, and expelled into the exhaust system 106 in the first, second, and third cylinders (i.e., 210, 220, 230), exhaust gas in the exhaust system 106 is collected, ignited, and recirculated into the exhaust system 106 in the fourth, fifth, and sixth cylinders (i.e., 240, 250, 260).

The controller 108 may be communicatively coupled to each of the cylinder valves in the second cylinder valve subset 112 (e.g., via a variable valve actuation assembly of the camshaft assembly 206). In response to detected conditions where exhaust gas recirculation may be desirable (e.g., at partial engine load, cold temperatures, etc.), the controller 108 may cause the cylinder valves in the second cylinder valve subset 112 to perform the recirculation operation (e.g., via the camshaft assembly 206). In some arrangements, the controller 108 adjusts the amount of fuel delivered to the cylinders undergoing a recirculation operation (e.g., 240, 250, 260) to compensate for the reduced amount of combustible air being collected in each cylinder. Further, in some arrangements, the controller 108 may be configured to enable the recirculation operation in an incremental manner. For example, the amount of exhaust gas being recirculated in a given cylinder may be gradually increased or decreased as needed (e.g., adjusting valve timing and duration via the variable valve actuation assembly). As another example, the number of cylinders undergoing a recirculation operation may be incrementally increased or decreased as needed (e.g., three, six, or nine cylinders of a V12 engine).

When the controller 108 determines that the recirculation operation is no longer desirable (e.g., when exhaust gas temperatures are at a desirable level, where the engine 200 is subject to full or nearly full load, etc.), the controller 108 may cause the second cylinder valve subset 112 to stop recirculating exhaust gas by actuating both cylinder intake valves and the cylinder exhaust valves of the second cylinder valve subset 112.

Figure 3:
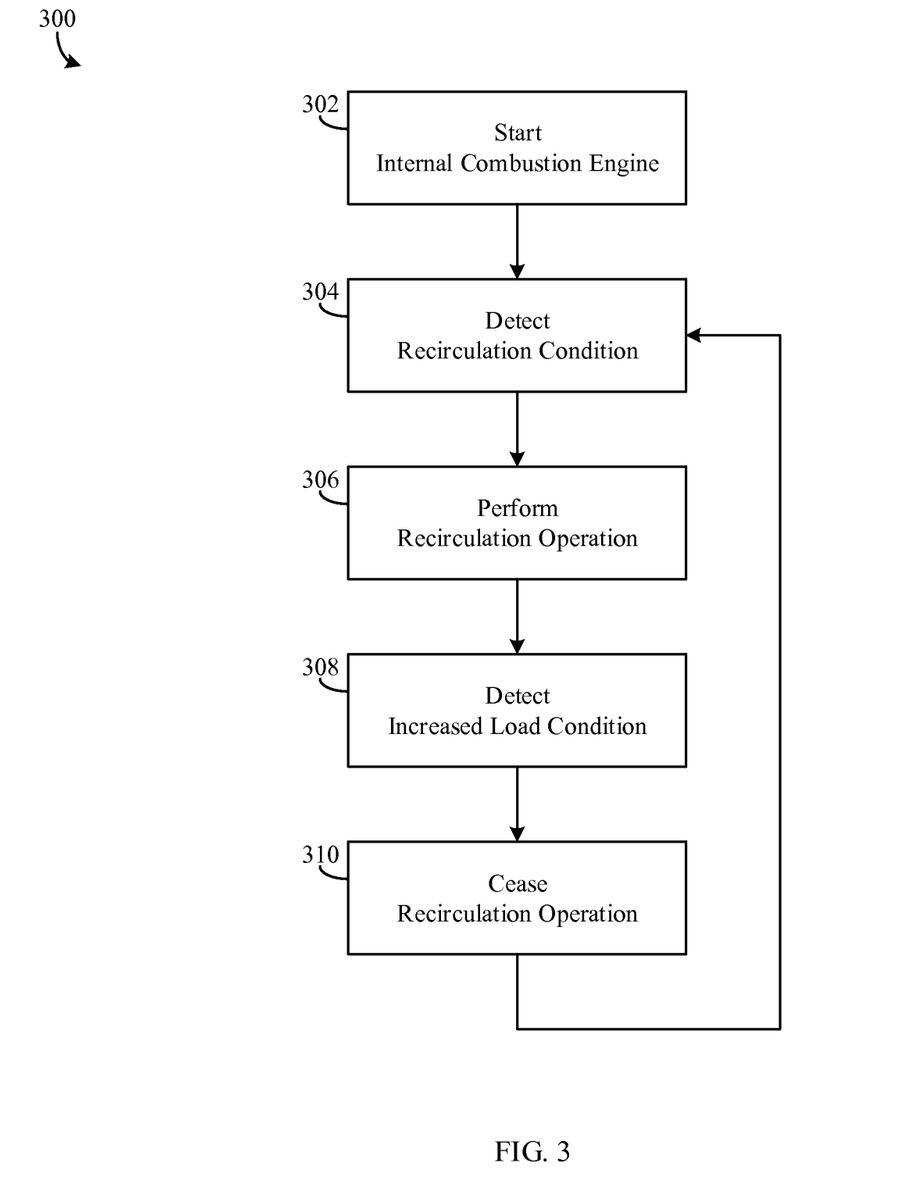
FIG. 3 illustrates a flow diagram showing a method of operating an internal combustion engine, according to an example embodiment.

FIG. 3 illustrates a flow diagram showing a method 300 of operating an internal combustion engine in accordance with example embodiments. FIG. 3 illustrates recirculating and non-recirculating operations caused by a controller associated with an internal combustion engine, in accordance with particular embodiments.

At 302, an internal combustion engine (e.g., the engine 100, the engine 200, etc.) is started. The engine may be started via a communicatively coupled starter (e.g., an electric motor, a pneumatic motor, a hydraulic motor, etc.), which upon a user input (e.g., a turn of a key in an ignition) actuates internal members of the engine sufficient to allow the engine to begin operating under its own power. In some arrangements, a controller (e.g., the controller 108, which may include a starter module) causes the engine to default to performing a recirculation operation (e.g., as discussed with respect to FIGS. 1 and 2) after starting at 302. In other arrangements, none of the cylinders are initially recirculating exhaust gas by default.

At 304, a recirculation condition is detected. The recirculation condition may be detected by a controller (e.g., a control module), which may be communicatively coupled to one or more sensors (e.g., sensors or sensor modules) disposed throughout the engine or an associated vehicle. The recirculation condition includes one or more conditions where exhaust recirculation within one or more cylinders of the engine would be desirable. For example, recirculation conditions may include instances where the engine is under partial load and fuel economy is prioritized. Recirculation conditions may also include instances where exhaust temperatures are too low for an associated aftertreatment system to effectively operate. Recirculation conditions may further include instances where a vehicle associated with the engine includes a waste heat recovery system (e.g., an organic Rankine cycle system) and the exhaust temperature is too low to effectively recapture waste heat.

At 306, a recirculation operation is performed. In some arrangements, the recirculation operation is performed in response to the recirculation condition detected at 304. The recirculation operation is performed on a subset of cylinders that includes less than all of the cylinders in the engine (e.g., the second subset of cylinders associated with the second cylinder valve subset 112). In some arrangements, the recirculation operation is caused by the controller (e.g., a control module). The controller may be communicatively engaged to a camshaft assembly (e.g., the camshaft assembly 206), which in turn is operatively engaged to a plurality of cylinder valves (e.g., 243, 244, 253, 254, 263, 264). The plurality of cylinder valves includes a plurality of cylinder intake valves (e.g., 243, 253, 263) and cylinder exhaust valves (e.g., 244, 254, 264). Each of the plurality of cylinder intake valves are in fluid communication with a cylinder of the set of cylinders and an intake system (e.g., the intake system 102). In turn, each of the plurality of cylinder exhaust valves are in fluid communication with a cylinder of the set of cylinders and an exhaust system (e.g., the exhaust system 106).

The recirculation operation includes closing each of the cylinder intake valves that are in fluid providing communication with the subset of cylinders, and allowing exhaust gas to recirculate between the subset of cylinders and the exhaust system instead. In some arrangements, the recirculation operation includes adjusting the camshaft assembly to include an intake actuation and an exhaust actuation for each of the cylinder exhaust valves associated with the subset of cylinders. In other arrangements, the recirculation operation includes holding the cylinder exhaust valves open, such that the operation of the pistons within the subset of cylinders pumps exhaust gas from the exhaust system into and out of each cylinder. Further, in some arrangements, the recirculation operation includes reducing the amount of fuel delivered to each cylinder in the subset of cylinders.

At 308, an increased load condition is detected. The increased load condition may be detected by the controller, in conjunction with one or more sensors (e.g., sensors or sensor modules) distributed throughout the engine or the associated vehicle. The increased load condition may include instances where the engine is at full or near full load, or where the engine load breaches some predetermined threshold level.

At 310, the recirculation operation is ceased. In some arrangements, the recirculation operation is ceased in response to the increased load condition detected at 308. The recirculation operation may be ceased by actuating the cylinder intake valves to provide air from the intake system to the subset of cylinders and ceasing the intake actuations of the cylinder exhaust valves associated with the subset of cylinders. The recirculation operation may be ceased until a recirculation condition is again detected (e.g., at 304).

For the purpose of this disclosure, the term(s) "coupled," "engaged," and other similar terminology means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

Implementations (and portions thereof) described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more sets of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a controller or a data processing apparatus on data stored on one or more computer-readable storage devices or received from other sources. The term "data processing apparatus" or "controller" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for a computer program, e.g., code that constitutes processor firmware, a protocol stack, a database management system, an operating system, a cross-platform runtime environment, a virtual machine, or a combination of one or more of them.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. An internal combustion engine comprising:
    a set of cylinders comprising a first subset of the set of cylinders and a second subset of the set of cylinders;
    an intake system disposed in fluid providing communication with the set of cylinders;
    an exhaust system disposed in fluid exchanging communication with the set of cylinders and atmosphere; and
    a controller configured to, in response to a detected recirculation condition, prevent fluid communication between the intake system and the second subset of the set of cylinders throughout an ignition cycle of each of the second subset of the set of cylinders and recirculate exhaust gas between the second subset of the set of cylinders and the exhaust system during the ignition cycle of each of the second subset of the set of cylinders and such that exhaust gas from the first subset of the set of cylinders is provided to the second subset of the set of cylinders.

2. The internal combustion engine of claim 1, wherein the controller is further configured to, in response to an increased load condition, allow fluid communication between the intake system and the second subset of the set of cylinders.

3. The internal combustion engine of claim 2, wherein the controller is further configured to, in response to the recirculation condition, decrease fuel delivery to the second subset of the set of cylinders, and wherein the controller is further configured to, in response to the increased load condition, increase fuel delivery to the second subset of the set of cylinders.

4. The internal combustion engine of claim 2, further comprising:
    a set of cylinder intake valves, each of the set of cylinder intake valves regulating airflow from the intake system to a cylinder of the set of cylinders; and
    a set of cylinder exhaust valves, each of the set of cylinder exhaust valves regulating exhaust gas flow exchanges between a cylinder of the set of cylinders and the exhaust system,
    wherein the controller is further configured to prevent fluid communication between the intake system and the second subset of the set of cylinders by having a subset of the set of cylinder intake valves corresponding to the second subset of the set of cylinders closed during an intake stroke, and
    wherein the controller is further configured to allow fluid communication between the intake system and the second subset of the set of cylinders by having the subset of the set of cylinder intake valves open during the intake stroke.

5. The internal combustion engine of claim 4, wherein the controller is further configured to recirculate exhaust gas between the second subset of the set of cylinders and the exhaust system by having the subset of the set of cylinder exhaust valves corresponding to the second subset of the set of cylinders open during the intake stroke, and
    wherein the controller is further configured to prevent recirculation of exhaust gas between the second subset of the set of cylinders and the exhaust system by having the subset of the set of cylinder exhaust valves closed during the intake stroke.

6. The internal combustion engine of claim 4, further comprising a variable valve actuation assembly operatively coupled to the subset of the set of cylinder intake valves and the subset of the set of cylinder exhaust valves and communicatively coupled to the controller, wherein the controller is further configured to respond to each of the recirculation condition and the increased load condition through the variable valve actuation assembly.

7. The internal combustion engine of claim 1, wherein the controller is further configured to incrementally respond to the recirculation condition increasing by incrementally decreasing fluid communication between the intake system and the second subset of the set of cylinders and incrementally increasing exhaust gas recirculation between the exhaust system and the second subset of the set of cylinders.

8. The internal combustion engine of claim 1, wherein the controller is further configured to incrementally respond to the recirculation condition increasing by incrementally increasing the number of cylinders in the second subset of the set of cylinders.

9. The internal combustion engine of claim 1, wherein the recirculation condition includes a partial load on the internal combustion engine.

10. The internal combustion engine of claim 1, further comprising an aftertreatment system coupled to the exhaust system, wherein the recirculation condition includes an exhaust temperature below a predetermined minimum temperature for operation of the aftertreatment system.

11. The internal combustion engine of claim 1, further comprising an aftertreatment system coupled to the exhaust system, wherein the recirculation condition includes an exhaust temperature below a target temperature.

12. The internal combustion engine of claim 1, further comprising a waste heat recovery system coupled to the exhaust system, wherein the recirculation condition includes an exhaust gas temperature being below a minimum temperature sufficient to recover waste heat from the exhaust gas via the waste heat recovery system.

13. The internal combustion engine of claim 1, wherein the recirculation condition includes an engine temperature below a predetermined minimum engine temperature.

14. A method of operating an internal combustion engine having a set of cylinders, a first subset of the set of cylinders, and a second subset of the set of cylinders, the method comprising:
  detecting, by a controller, a recirculation condition associated with the internal combustion engine; and
  executing, by the controller and in response to the recirculation condition, a recirculation operation to be performed on the second subset of the set of cylinder throughout an ignition cycle of each of the second subset of the set of cylinders by preventing fluid communication between the second subset of the set of cylinders and an intake system and recirculating exhaust gas between the second subset of the set of cylinders and an exhaust system during the ignition cycle of each of the second subset of the set of cylinders and such that exhaust gas from the first subset of the set of cylinders is provided to the second subset of the set of cylinders, the exhaust system configured to provide exhaust gas to atmosphere.

15. The method of claim 14, further comprising:
  detecting, by the controller, an increased load condition; and
  ceasing, by the controller and in response to an increased load condition, the recirculation operation by allowing fluid communication between the intake system and the second subset of the set of cylinders.

16. The method of claim 15, wherein executing the recirculation operation includes decreasing fuel delivery to the second subset of the set of cylinders, and wherein ceasing the recirculation operation includes increasing fuel delivery to the second subset of the set of cylinders.

17. The method of claim 15, wherein the controller incrementally responds to the recirculation condition increasing by incrementally decreasing fluid communication between the intake system and the second subset of the set of cylinders and incrementally increasing exhaust gas recirculation between the exhaust system and the second subset of the set of cylinders.

18. The method of claim 15, wherein the controller incrementally responds to the recirculation condition increasing by incrementally increasing the number of cylinders in the second subset of the set of cylinders.

19. An exhaust recirculation controller for an internal combustion engine having a set of cylinders, a first subset of the set of cylinders, and a second subset of the set of cylinders, the controller selectively executing recirculating operations on the second subset of the set of cylinders, the second subset of the set of cylinders in fluid receiving communication with an intake system and in fluid exchanging communication with an exhaust system configured to provide exhaust gas to atmosphere, the exhaust recirculation controller comprising:
  at least one sensor module configured to collect data relating to recirculation conditions and increased load conditions; and
  a recirculation condition detection module configured to detect a recirculation condition based on data received from the at least one sensor module;
  a recirculation operation execution module configured to execute, in response to the recirculation condition, a recirculation operation on the second subset of the set of cylinders by preventing fluid communication between the intake system and the second subset of the set of cylinders throughout an ignition cycle of each of the second subset of the set of cylinders and recirculating exhaust gas between the exhaust system and the second subset of the set of cylinders during the ignition cycle of each of the second subset of the set of cylinders.

20. The exhaust recirculation controller of claim 19 further comprising:
  an increased load condition detection module configured to detect an increased load condition based on data received from the at least one sensor module;
  a recirculation operation cancellation module configured to cease, in response to the increased load condition, the recirculation operation by allowing fluid communication between the intake system and the second subset of the set of cylinders.

21. The exhaust recirculation controller of claim 19 further comprising a fuel delivery module configured to decrease fuel delivery to the second subset of the set of cylinders during the recirculation operation and increase fuel delivery to the second subset of the set of cylinders when the recirculation operation is ceased.

* * * * *